(12) United States Patent
Radjou et al.

(10) Patent No.: US 10,976,722 B2
(45) Date of Patent: Apr. 13, 2021

(54) METHOD AND APPARATUS FOR GENERATING A 3D MODEL OF AN OBJECT

(71) Applicant: BIOMODEX S.A.S., Paris (FR)

(72) Inventors: Sidarth Radjou, Plaisir (FR); Mayra Guadalupe Mora Espinosa, Paris (FR)

(73) Assignee: BIOMODEX S.A.S, Paris (FR)

( * ) Notice: Subject to any disclaimer, the term of this patent is extended or adjusted under 35 U.S.C. 154(b) by 41 days.

(21) Appl. No.: 16/333,872

(22) PCT Filed: Sep. 19, 2017

(86) PCT No.: PCT/EP2017/073621
§ 371 (c)(1),
(2) Date: Mar. 15, 2019

(87) PCT Pub. No.: WO2018/050915
PCT Pub. Date: Mar. 22, 2018

(65) Prior Publication Data
US 2019/0204810 A1    Jul. 4, 2019

(30) Foreign Application Priority Data
Sep. 19, 2016    (EP) .................................... 16189533

(51) Int. Cl.
*G05B 19/4099*    (2006.01)
*B33Y 50/00*    (2015.01)
(Continued)

(52) U.S. Cl.
CPC .......... *G05B 19/4099* (2013.01); *B33Y 50/00* (2014.12); *G06F 30/00* (2020.01);
(Continued)

(58) Field of Classification Search
CPC .................................................. G05B 19/4099
See application file for complete search history.

(56) References Cited

U.S. PATENT DOCUMENTS 8,041,095 B2    10/2011    Mohamed et al.
8,565,909 B2    10/2013    Bickel et al.
(Continued)

OTHER PUBLICATIONS

International Search Report for PCT/EP2017/073621, dated Dec. 20, 2017.
(Continued)

*Primary Examiner* — Tejal Gami
(74) *Attorney, Agent, or Firm* — Ray Quinney & Nebeker P.C.; Paul N. Taylor

(57) ABSTRACT

A method for generating a 3D model for fabricating a multi-material object using additive manufacturing. The method comprises providing a first volumetric model of an object in a deformed configuration, generating a second volumetric model from the first volumetric model and assigning materials to the second volumetric model by: a) defining a cluster of elementary volumetric elements of the second volumetric model, b) selecting a cluster object material in the database of object materials by minimizing a cost function determined by computing a deformed configuration of the second volumetric model under a set of predefined loads and constraints, c) partitioning the elementary volumetric elements of the cluster in two sub-clusters based on the deformed configuration, d) repeating step b) for each sub-clusters. The method further comprises generating a 3D model for fabricating an object from the second volumetric model and the assigned materials.

13 Claims, 5 Drawing Sheets

(51) Int. Cl.
    *G06F 30/00*       (2020.01)
    *G06F 30/20*       (2020.01)
    *G06F 30/23*       (2020.01)
    *G06F 111/06*     (2020.01)
    *G06F 113/26*     (2020.01)
    *G06F 119/18*     (2020.01)

(52) U.S. Cl.
    CPC .............. *G06F 30/20* (2020.01); *G06F 30/23* (2020.01); *G05B 2219/49023* (2013.01); *G06F 2111/06* (2020.01); *G06F 2113/26* (2020.01); *G06F 2119/18* (2020.01); *Y02P 90/02* (2015.11)

(56) References Cited

U.S. PATENT DOCUMENTS

| | | | |
|---|---|---|---|
| 9,042,613 B2 | 5/2015 | Spilker et al. | |
| 2012/0053716 A1* | 3/2012 | Bickel | G06F 30/00 700/98 |
| 2012/0185218 A1 | 7/2012 | Bickel et al. | |
| 2012/0203266 A1 | 8/2012 | Mielekamp et al. | |
| 2014/0046469 A1 | 2/2014 | Bickel et al. | |
| 2014/0279177 A1* | 9/2014 | Stump | G06Q 30/0611 705/26.4 |
| 2014/0316748 A1 | 10/2014 | Bickel et al. | |
| 2016/0096318 A1 | 4/2016 | Bickel et al. | |

OTHER PUBLICATIONS

Written Opinion for PCT/EP2017/073621, dated Dec. 20, 2017.

Skouras, et. al., "Computational design of actuated deformable characters", ACM Transactions on Graphics (106), vol. 32, No. 4, Jul. 1, 2013, pp. 1, 82:2, 82:5, 82:6.

Xu, et. al., "Interactive Material Design Using Model Reduction", ACM Transactions on Graphics (106), vol. 34, No. 2, Mar. 2, 2015, pp. 18:4, 18:6, 18:7.

* cited by examiner

METHOD AND APPARATUS FOR GENERATING A 3D MODEL OF AN OBJECT

CROSS REFERENCE TO RELATED APPLICATIONS

This application is a national stage application under 35 U.S.C. 371 of PCT Application No. PCT/EP2017/073621, having an international filing date of 19 Sep. 2017, which designated the United States, which PCT application claimed the benefit of Europe Patent Application No. 16189533.9, filed Sep. 19, 2016, both of which are incorporated by reference in their entirety.

FIELD OF THE INVENTION

The instant invention relates the design and fabrication of multi-material objects from 3D models.

More precisely, the invention relates to methods and apparatus for generating 3D models of multi-material objects.

BACKGROUND OF THE INVENTION

Additive manufacturing (AM) is understood as any process in which a three-dimensional object is synthetized from a 3D model.

The field of additive manufacturing has gathered tremendous interest in recent year, allowing for the production of personalized on-demand objects with shapes or geometries that may even be impossible to manufacture using traditional technics.

Various AM techniques exist such as stereolithography, fused deposition modeling, 3D inkjet printing, also known as Polyjet™ (Stratasys Ltd., North America), Continuous Liquid Interface Production (CLIP) or the like.

A three-dimensional object may typically be formed by sequential-layer material addition/joining throughout a 3D work envelope under automated control. However, several novel AM techniques do not involve such sequential-layer addition. On example is Continuous Liquid Interface Production.

While traditional techniques such as stereolithography or fused deposition modeling involve a single consumable material, recent advances in the field have led to the possibility of producing multi-material object made from several materials with differing physical properties (color, density, elasticity, etc.).

One example of such novel manufacturing methods is 3D inkjet printing in which building materials are selectively jetted from one or more printing heads and deposited onto a fabrication tray in consecutive layers according to a predetermined configuration defined by a software file. The printing head may be, for example, an ink jet head provided with a plurality of dispensing nozzles arranged in an array of one or more rows along a longitudinal axis of the printing head.

These multi-material manufacturing technics have opened the way for fabricating realistic complex objects with varying physical properties such as color, density, elasticity, etc.

Multi-colored objects are straightforward applications of these techniques but many other applications shows great potential.

Among these new applications, the possibility of controlling the deformation properties of an object is of particular interest for copying real-life objects in a convincing manner or designing novel complex objects.

One example of application is related to surgical training and medical device development and testing in which benchtop devices realistically reproducing the behavior of an organ could be of great interest for training surgeon to perform surgery or testing medical device in real life conditions.

Among other fields, the invention can thus find applications in surgical training and medical device development and testing.

However, while a multi-colored object is relatively easy to design, generating a 3D model for fabricating an object with controlled elastic properties has proved to be more difficult.

Indeed, while the color of an object is a local physical property, the deformation of the object results from global interactions between the various parts of the object. The selection and positioning of materials within the object thus involve a global computation of the dynamic behavior of the object.

Additional difficulties come from the limitation on the number of materials for fabricating the object. While newer 3D printers are able to print ever-increasing numbers of materials, the range of materials available at a given time on a given apparatus is in practice always limited.

Moreover, printing materials are primarily selected on the basis of their printing properties and the range of physical properties is thus also limited.

The algorithms currently used to design multi-material 3D model of objects with controlled physical properties are thus often trouble to converge to an accurate or printable solution, or requires exponential computing power.

One approach for reducing the computing power and increasing the convergence speed and stability of the algorithm is to assume that the elementary parts constituting the object are mechanically dependent only along one dimension of space, and are mechanically independent from each other in the two other directions of space. This way, the combination space of the 1D sequence of materials is limited and can be explored with classical combinational techniques.

Such an approach is described for instance in U.S. Pat. No. 8,565,909. It can be used for the generation of 3D models of layered objects such as a footware sole.

However this approach cannot be extended to the design of object with three-dimensionally varying mechanical properties and multi dimensions mechanical interactions with environment (stress load, boundary conditions . . . ) without an exponential increase in computing power and time and a strong decrease in convergence stability.

Another approach is described for instance in "Interactive Material Design Using Model Reduction" by Hongyi Xu, published in ACM Transactions on Graphics, Vol. 34, No. 2, Article 18, Publication date: February 2015. This approach aims at solving the combinational optimization problem by first determining a continuous material along the object with varying properties. The continuous distribution of material is then discretized in individual elementary material volumes based on the printing materials offered by a given printer.

However, this approach does not guarantee that the final object, made with a limited number of materials, will show accurate elastic properties.

In particular, in many cases, the physical properties of the materials are not regularly spaced from one another along the full range of physical properties. A discrete optimization process then often produces more accurate results.

Eventually, some approaches have been specifically designed for two-material objects and are based on a linear interpolation between said two materials followed by a step of driving the linear combination obtained toward each of the two materials.

"Computational Design of Actuated Deformable Characters" by Melina Skouras et al. Published in ACM Transactions on Graphics (TOG)—SIGGRAPH 2013 Conference Proceedings TOG Homepage Volume 32 Issue 4, July 2013 details such a method.

Such two-material approach cannot be extended to the design of object with a plurality of N>2 materials without degrading the convergence of the algorithm.

There is thus a need for a method for generating a 3D model for fabricating a multi-material object which would offer an accurate solution for a large range of manufacturing materials, an improved convergence speed and reliability and require less computing power than the prior art.

SUMMARY OF THE INVENTION

To this aim, a first object of the invention is a method for generating a 3D model for fabricating a multimaterial object using additive manufacturing, the method comprising:

providing a first volumetric model of an object in at least a deformed configuration, generating a second volumetric model from said first volumetric model, said second volumetric model being divided in a plurality of elementary volumetric elements, assigning to each elementary volumetric element of the second volumetric model a material selected in a database of M object materials by performing at least the following steps:

a) defining a cluster of elementary volumetric elements of the second volumetric model, b) selecting a cluster object material in the database of object materials by minimizing a cost function of said cluster determined by computing at least one deformed configuration of the second volumetric model under set of predefined loads and constraints at least one elementary volumetric element of said cluster has been assigned intrinsic material properties associated to a material of the database of object materials, c) partitioning the elementary volumetric elements of said cluster in at least two subclusters based on the deformed configuration of said cluster, d) repeating at least once step b) for each of said at least two subclusters, and generating a 3D model for fabricating an object from the second volumetric model and the materials assigned to each elementary volumetric element of the second volumetric model.

In some embodiments, one might also use one or more of the following features:

said cost function is a function of a deformed configuration of the cluster and the deformed configuration of the first volumetric model;

step b) comprises an operation b1) of computing a deformed configuration cost function of the second volumetric model, associated to at least one material of the database of object materials, said operation b1) comprising:

b1-1) assigning to each elementary volumetric element of said cluster identical intrinsic material properties associated to said material, b1-2) determining a deformed configuration of the second volumetric model under the set of predefined loads and constraints, b1-3) computing a cost function of said cluster associated to said material, said cost function being a function of a strain error between the deformed configuration of said cluster and the deformed configuration of the first volumetric model;

said operation b1) of computing a deformed configuration cost function of the second volumetric model is performed for each material of a subset of M materials of the database of object materials, and step b) further comprises an operation b2) of selecting a cluster object material in the database of object materials by comparing the cost functions computed for each material in said subset of materials of the database of object materials;

an ordered subset of M materials of the database of object materials is associated to a cluster of the second volumetric model, and the materials of said ordered subset are ordered according to a physical property of said materials, in particular according to a stiffness of said materials;

said operation b1) of computing a deformed configuration cost function of the second volumetric model is performed for a preselected material in the ordered subset of M materials of the database of object materials, and step b) further comprises the operations of:

b2) comparing a function of said cost function to a termination criterion to determine whether said preselected material can be selected as the cluster object material, b3-1) if said preselected material can be selected as the cluster object material perform step c), b3-2) if said preselected material cannot be selected as the cluster object material, preselecting another material in said subset of M materials of the database of object materials by comparing said cost function to a direction criterion and reiterate at least once operations b1) through b3-1), b3-2);

each elementary volumetric element of the cluster of the second volumetric model is respectively associated with at least one elementary volumetric element of the first volumetric model;

step c) comprises an operation c1) of comparing a location of at least one elementary volumetric element in the deformed configuration of the cluster with a location of at least one elementary volumetric element in the deformed configuration of the first volumetric model;

the step of partitioning the elementary volumetric elements of the cluster in at least two subclusters comprises an operation c2) of determining, for each subcluster of said at least two subclusters, a subset of materials of the database of object materials associated to said subcluster on the basis of the deformed configuration of the cluster;

steps b) and c) are repeated until each subclusters comprise a single elementary volumetric element;

steps b) and c) are repeated until a difference between the deformed configuration of the second volumetric model and the deformed configuration of the first volumetric model of the object satisfy a convergence criterion;

the first volumetric model is provided by:

receiving a three dimensional model of an object comprising at least one surface mesh representative of an interface of the object, in particular an interface of the object associated to a discontinuity in the physical properties of the object, generating the first volumetric model from said three dimensional surface mesh by performing a volumetric model generation, for instance finite element volumetric model generation;

the set of predefined loads and constraints comprise a load on said interface of the object;

the database of object materials comprises a plurality of 3D printed materials and, optionally, additional metamaterials and/or nonprintable materials such as water, gels, metals, ions, ceramics, biomolecules and the like.

Another object of the invention is an apparatus for generating a 3D model for fabricating a multi-material object using additive manufacturing, the apparatus comprises at least:

a memory unit operative to store at least a first volumetric model of an object, set of predefined loads and constraints to be applied on the first volumetric model of the object and a deformed configuration of the first volumetric model of the object under the set of predefined loads and constraints, a processing unit operative to generate a second volumetric model from said first volumetric model, said second volumetric model being divided in a plurality of elementary volumetric elements, assign to each elementary volumetric element of the second volumetric model a material selected in a database of M object materials by:

a) defining a cluster of elementary volumetric elements of the second volumetric model, b) selecting a cluster object material in the database of object materials by minimizing a cost function of said cluster determined by computing at least one deformed configuration of the second volumetric model under the set of predefined loads and constraints at least one elementary volumetric element of said cluster has been assigned intrinsic material properties associated to a material of the database of object materials, c) partitioning the elementary volumetric elements of said cluster in at least two subclusters based on the deformed configuration of said cluster, d) repeating at least once step b) for each of said at least two subclusters, and generate a 3D model for fabricating an object from the second volumetric model and the materials assigned to each elementary volumetric element of the second volumetric model.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION

Figure 1:
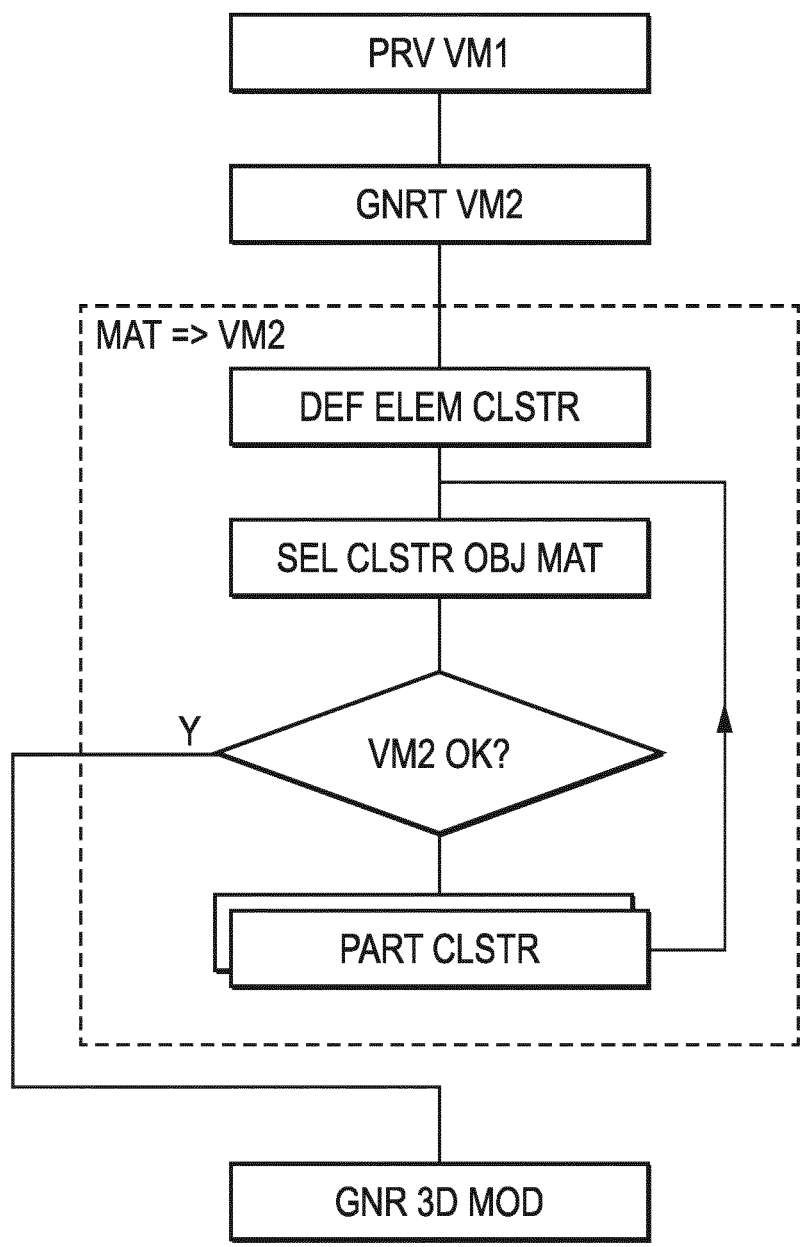
FIG. 1 is a flow chart illustrating the operations of a method for generating a 3D model according to an embodiment of the invention.
Figure 2:
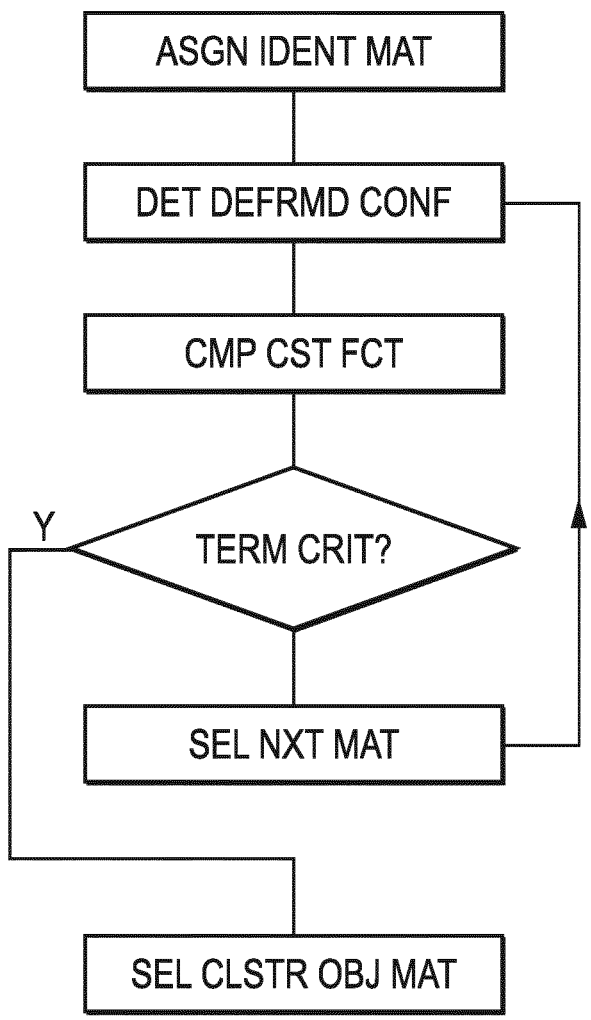
FIG. 2 is a flow chart detailing the sub-steps of the operation of assigning a material to each elementary volumetric element of the second volumetric in the method of FIG. 1.

FIGS. 1 and 2 illustrate a method for generating a 3D model for fabricating a multi-material object using additive manufacturing according to a first embodiment of the invention.

The fabricated multi-material object presents controlled deformations, meaning that, under predefined loads and constraints (Stress field, Volumetric forces, Boundary conditions), the object takes a target deformation configuration.

Figure 5:
FIG. 5 illustrates examples of first and second volumetric model wherein the object is a copy of an original object which is a portion of a human organ.

In one non-limitative example of realization illustrated on FIG. 5, the object is a copy of an original object which is a portion of a human organ.

This approach for fabricating objects with desired deformation behavior has a number of distinct steps that are summarized on FIG. 1 and detailed hereafter.

First, the mechanical properties of the object materials that the printer/fabricator has to work with are measured and characterized. This can be done ahead of time and stored as intrinsic material properties associated to each material of a database of object materials stored in electronically-readable storage.

By "mechanical properties" and "mechanical behaviors", it is meant for instance uni-axial or multi-axial tensile strength or modulus, uni-axial or multi-axial compressive strength or modulus, shear strength or modulus, coefficient of static or dynamic friction, surface tension, elasticity.

The database of object materials may comprise a plurality of 3D printed materials.

The object materials may exhibit linear mechanical behaviors but also non-linear, hyper-elastic stress-strain mechanical behaviors.

The physical behavior of the materials can be represented by defining intrinsic material properties.

The intrinsic material properties comprise functions modeling the physical behavior of a material. For instance the intrinsic material properties can include a density of a material, Young Modulus, Poisson ratio, thermal conductivity, electric conductivity. The intrinsic material properties may also take into account non-linear effects in the material.

The intrinsic material properties define for instance a stress-strain relationship as a function of the local strain $\varepsilon(u)$. The stress-strain relationship can be stored as a matrix E and parameterized by a set of parameters. The parameters can be static values or function of various parameters, for instance a non-linear function of strain. The matrix E can thus also represents a non-linear function $E(p(u))$.

In some embodiments, additional metamaterials and/or non-printable material may be included in the database of object materials.

Metamaterials are microstructures of materials whose mechanical properties may be averaged over the structures to be assimilated to an equivalent homogeneous material.

Non-printable materials comprise for instance non-polymerizable materials. Such non-printable materials may for instance comprise water, gels, metals, ions, ceramics, biomolecules and the like.

These object materials may also be provided by a 3D printer but usually don't have to be polymerized during the printing process and may stay fluid or liquid in the object. The size of the sub-region of the object made solely from these non-printable materials may thus be limited in some specific application of the invention in order to ensure the mechanical stability of the object.

A first step of the method is illustrated on FIG. 1 and comprises providing a first volumetric model VM1 of an object. The first volumetric model is for instance received by an input unit of an apparatus for generating a 3D model as detailed further below.

In some embodiment, the first volumetric model may also be generated by the apparatus for generating a 3D model.

The first volumetric model comprises a three-dimensional set of nodes which defines a plurality of elementary volumetric elements partitioning a first space region modeled by the first volumetric model.

The three-dimensional set of nodes and the elementary volumetric elements of the first volumetric model are defined in order to be able to perform a three-dimensional numeric simulation of the deformations of the first volumetric model. Examples of such numeric simulation are finite element simulation, discrete element method, combined finite element-discrete element method and the like.

The elementary volumetric elements are for instance selected among the shapes of tetrahedron, pyramid, triangular prism and hexahedron. In particular, tetrahedrons may be selected as elementary volumetric elements.

The first volumetric model may in particular comprise unstructured grid, i.e. tessellation of the first space regions in an irregular pattern.

This way, the first volumetric model may be adapted to present a refined structure where spatial variations of deformations of the mesh are locally high.

The first volumetric model may in particular be generated from a three dimensional surface mesh by performing a volumetric model generation, for instance finite-element volumetric model generation for example by using a software such as "Abaqus" ® by Dassault System Inc.

The first volumetric model may for instance be generated and received by an apparatus for generating a 3D model as follow.

A three dimensional model of an object comprising at least one surface mesh representative of an interface of the object may be received.

By "surface mesh" it is meant a three-dimensional surface which may be closed or open. The three-dimensional surface may be a CAD model or a polygon mesh and may be tessellated or defined by a set of equations.

The interface of the object may for instance be associated to a discontinuity in the physical properties of the object.

In one embodiment, the three dimensional model of the object is generated on a computer, for instance by using a 3D modeling software.

In another embodiment, the three dimensional model of the object may be acquired from measurements of a physical original object copied by the manufacturing object.

The measurements may comprise a 3D scanning of the object and/or volumetric measurements, in particular non-invasive measurements, for instance if the object is an internal part of a larger object that should not be destroyed, for instance living tissues.

By "a non-destructive measurement of an imaged region located inside the heterogeneous object" it is mean a measurement of a local physical parameter of a region located inside the heterogeneous object without damaging said object. Nondestructive imaging methods are known in the field of medical imaging and comprise for instance Radiography, Magnetic Resonance Imaging (MRI), Ultrasound, Elastography, Tactile imaging, Photoacoustic imaging, Thermography, Echocardiography, Functional near-infrared spectroscopy, Tomography, Computer-assisted Tomography such as X-ray computed tomography, Positron emission tomography or Magnetic resonance imaging and Nuclear medicine such as Scintigraphy or Single-photon emission computed tomography for instance.

A volumetric measurement typically output a three dimension scalar field or vector field of an imaged region. In the case of a three-dimensional scalar field, the volumetric measurement usually comprises a set of three-dimensional pixels, commonly referred as "voxel" (short for "volumetric pixel") juxtaposed with one another along the three dimensions. A scalar or vector field representative of the local physical parameter in a voxel may be associated to every voxel. The scalar field is for example a locally measured density (enlarged to the voxel).

A surface mesh of the object may then be determined by performing a topological segmentation of the measurement.

Such a topological segmentation can be automatically performed by applying an image processing algorithm, adapted to identify clusters of three-dimensional pixels in the three dimensional model of an imaged region according to:
  the local physical parameter associated to each voxel (minimal density, density with regard to the neighboring voxels), and
  constrains on the geometric properties of the voxel clusters (for example a minimal size or a specific shape of an organ).

Then, a surface reconstruction process—for example a "marching cubes" method—may be implemented to build a three-dimensional surface mesh of the object from the output of the topological segmentation operation.

The surface mesh is thus a three-dimensional surface which delimits a boundary of a cluster of voxel identified during the topological segmentation operation.

In one particular example of the invention, the surface mesh may be an internal interface of a larger object, delimiting the original object. The original object may then for instance be an organ or a portion of an organ inside a body and the surface mesh may be an interface of said organ.

Several surface meshes may be determined for each organ or organ portion identified in the imaged region.

Surface meshes may be part of the three dimensional model of the imaged region.

This embodiment may be combined with the previous embodiment, i.e. the three dimensional model of the physical original object may be modified on a computer, for example by using a 3D modeling software, in order to make an object that is not an attempt at a copy but has different characteristics than the original object.

The first volumetric model VM1 is then generated from said three dimensional surface mesh by performing a volumetric model generation, for instance finite-element volumetric model generation.

Figure 4A:
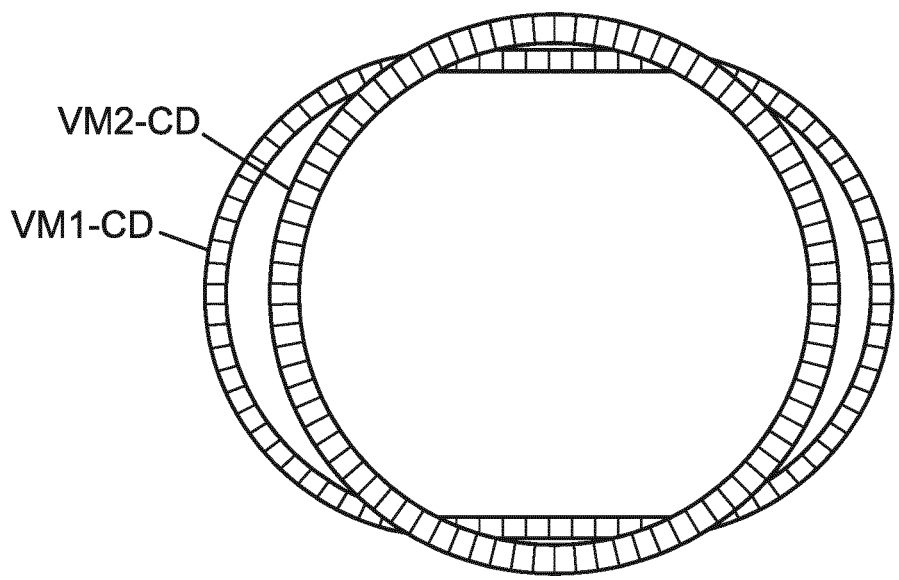
FIG. 4A to 4C illustrates successive steps of partitioning the second volumetric model in clusters during the operation of assigning a material to each elementary volumetric element of the second volumetric of FIG. 2.

The first volumetric model is provided in at least a deformed configuration VM1-CD illustrated on FIG. 4A.

By a "configuration of a volumetric model", it is meant three-dimensional locations of the nodes which defines the plurality of elementary volumetric elements partitioning the space region modeled by the volumetric model.

In an embodiment of the invention, at least two configurations of the first volumetric model may be provided.

Figure 3:
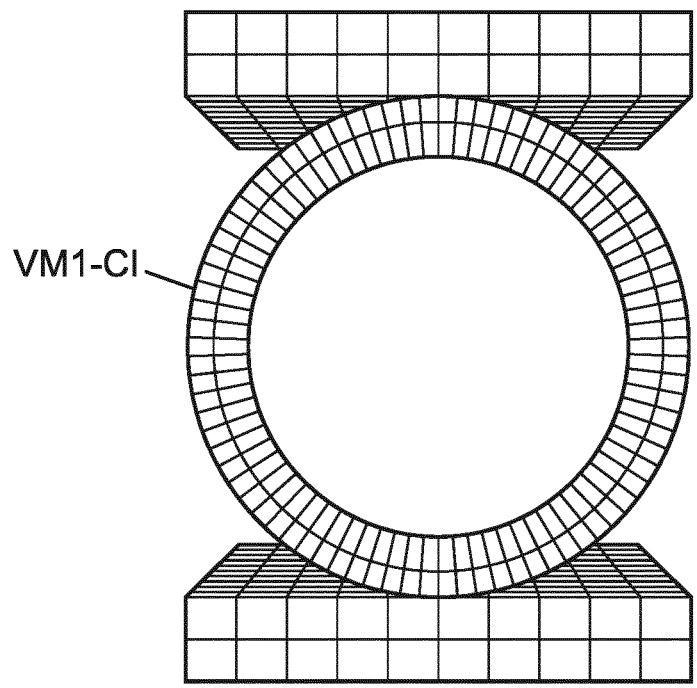
FIG. 3 illustrates an embodiment of a first volumetric model of the invention in an initial configuration.

For instance, an initial configuration of the first volumetric model VM1-CI (illustrated on FIG. 3) and a deformed configuration of the first volumetric model VM1-CD (illustrated on FIG. 4A to 4C)) may be provided.

The deformed configuration of the first volumetric model may also be called a "target deformed configuration" as explained in greater details further below.

The initial configuration and the deformed configuration comprise distinct locations of at least one node, in particular of several or all nodes of the first volumetric model.

The initial configuration and the deformed configuration may be determined for several three dimensional surface meshes as detailed above, for instance by performing several volumetric measurements of a physical original object copied by the manufacturing object under various load conditions. These measurements are similar to the measurements used to determine the three dimensional model of the object mentioned before and will not be described again.

The deformed configuration of the first volumetric model may also be generated on a computer, for instance by using a 3D modeling software or by using a numerical simulation software to compute a deformed configuration of the first volumetric model.

In yet another embodiment of the invention, the initial configuration of the first volumetric may be generated on a computer or determined by volumetric measurements of a physical original object copied by the manufacturing object and the deformed configuration may be then be determined from the initial configuration by a numerical simulation of a deformation of the initial configuration of the first volumetric under a first set of predefined loads and constraints. The deformed configuration of the first volumetric model of the object may then be associated to the first set of predefined loads and constraints.

By "a set of predefined loads and constraints", it is meant the effect of the surrounding environment on the model. The predefined loads and constraints may thus comprise loads which may be mechanical such as volumetric forces (gravity), surface forces (loads, pressure), ponctual forces (moment, . . . ), thermic such as thermal load, or electric or magnetic such as concentrated charge. The predefined loads and constraints may also comprise boundary conditions which may also be mechanical such as encastrement, displacement/rotation, velocity, general contact, self-contact but also thermal or fluidic such as temperature, acoustic pressure and electric potential. The predefined loads and constraints may also comprise global environmental effects such as temperature field and pressure field (scalar or vector field).

A second volumetric model VM2 is then generated from the first volumetric model.

The second volumetric model also comprises a three-dimensional set of nodes which define a plurality of elementary volumetric elements dividing a second space region modeled by the second volumetric model.

The properties of the first volumetric model that were described above can thus also be applied to the second volumetric model.

The second volumetric model VM2 may be generated from the initial configuration VM1-CI of the first volumetric model.

The configuration of the second volumetric model may be similar to the initial configuration of the first volumetric model, meaning that the location of its nodes may be similar. Alternatively, the external surface or interface of the second volumetric model only may be similar to the external surface or interface of the second volumetric model and the internal arrangement of the nodes of the first and second volumetric models may be distinct.

The second volumetric model is a model of the fabricated object whose deformed configuration under a second set of predefined loads and constraints is intended to be as close as possible to the deformed configuration of the first volumetric model.

The second volumetric model may thus mesh a similar space region than the first volumetric model and may in general be roughly identical to the first volumetric model.

Each elementary volumetric element i of the second volumetric model is respectively associated with at least one elementary volumetric element i of the first volumetric model.

It should be noted, however, that the second volumetric model may also slightly depart from the first volumetric model and/or be adapted to take into account various constrains related to the fabrication process.

Such adaptation can involve a simplification of the topology to ensure a reliable or possible manufacturing. Among the manufacturing constraints are: setting a minimum wall thickness, preventing undercut molding, taking into account the minimal droplet size of the three-dimensional printing process (about 16 microns diameter). Additional constraints are related to cleaning the support material after the 3D printing. One or more constraints from the following list can thus be taken into account:

a minimum size of the elementary volumetric element, for example each element must contain a cube of dimension 16 μm*16 μm*16 μm, corresponding to a minimum size of polymerized drops;

a geometric parameter relating to the minimum distance g between two points of the polyhedron, for example by ensuring that g>a*g, where $g=\min_{(A,B) \text{ belonging to element}} |(xA, yA, zA)-(xB, yB, zB)|$ and a is a predefined scalar.

A second set of Predefined loads and constrains is provided and intended to be applied on the second volumetric model of the object.

In some embodiments of the invention, the second set of predefined loads and constraints may be identical to the first set of predefined loads and constraints used to determine the deformed configuration of the first volumetric model. In other embodiments, the second set of predefined loads and constraints may depart from the first set of predefined loads and constraints, for instance by incorporating additional physical phenomenon such as gravity and/or ignoring some phenomenon.

In one non-limitative example of application, the predefined loads and constraints are representatives of surgical mechanical forces that are exerted on the tissues of the internal element during a predefined surgical operation. For example, the second set of predefined loads and constraints may then comprise an external stress field σ defined to correspond to the stress field exerted by a neuroradiologist introducing a catheter in a carotid artery, and deploying a stent in the artery. The set of predefined loads and constraints may include additional force field such as surrounding organs stress field and/or blood pressure.

In such a case, the set of predefined loads and constraints will be similar to the stress field applied on the inner surface of the carotid artery and for example directed along the outer local normal at each point of the inner surface of the carotid artery with a magnitude similar to the magnitude of a force exerted by a stent, typically between 10 and 100 kPa. Once the configurations VM1-CI, VM1-CD of the first volumetric model, the second volumetric model VM2 and the set of predefined loads and constraints have been provided or generated, the method according to the invention involves an operation of assigning to each elementary volumetric element of the second volumetric model a material selected in a database of M object materials as illustrated on FIGS. 2 and 4A-4C.

Figure 4B:
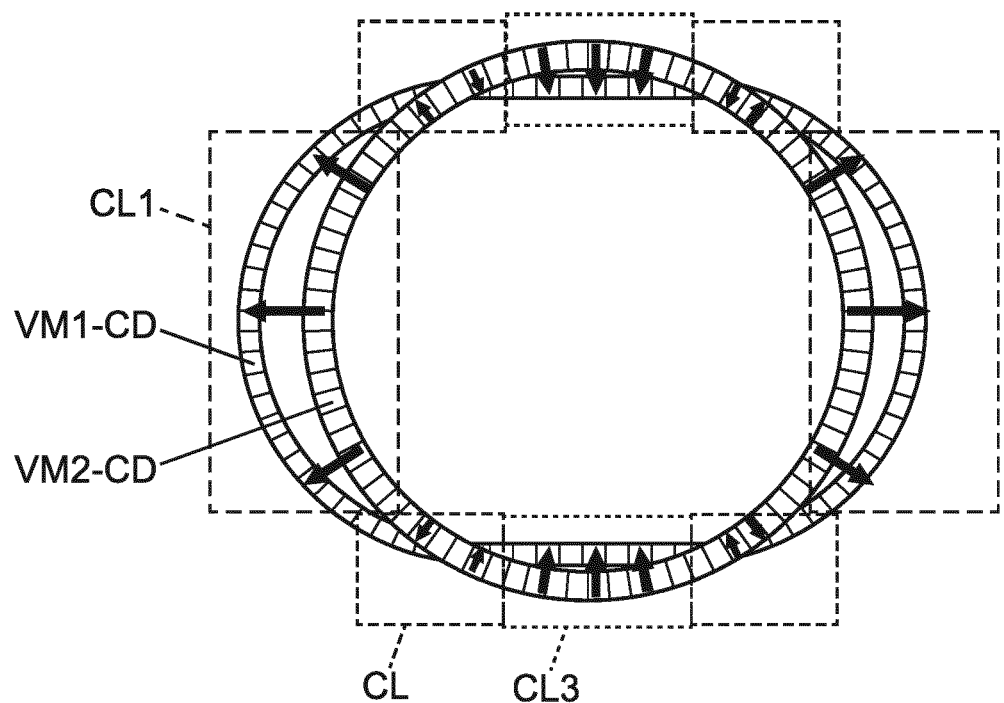
Figure 4C:
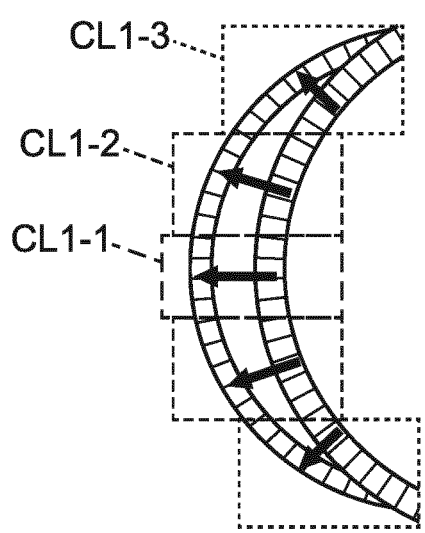

This operation comprises the following general steps that are illustrated on FIGS. 4A to 4C:

a) defining a cluster of elementary volumetric elements of the second volumetric model, b) selecting a cluster object material in the database of object materials by minimizing a cost function of said cluster determined by computing at least one deformed configuration of the second volumetric model under the second set of predefined loads and constraints wherein at least one elementary volumetric element of said cluster has been assigned intrinsic material properties associated to a material of the database of object materials, c) partitioning the elementary volumetric elements of said cluster in at least two sub-clusters based on the deformed configuration of said cluster, d) repeating at least once step b) for each of said at least two sub-clusters.

These general steps will now be described in more details.

During step a), a cluster of elementary volumetric elements of the second volumetric model is defined.

When step a) is performed for the first time during the method, the cluster of elementary volumetric elements may comprise the totality of the elementary volumetric elements of the second volumetric model.

As the method proceeds, the cluster may comprise a smaller and smaller number of elementary volumetric elements until it reaches a single elementary volumetric element as it will become apparent from the following description of the method.

An object material is then selected in the database of object materials for the cluster. The selection of the object material for the cluster is obtained as the results of minimizing a cost function of the cluster.

This cost function is a function of the deformed configuration of the first volumetric model and a deformed configuration of the cluster detailed further below and illustrated on FIG. 4A.

The cost function is for instance a function of a strain error between the deformed configuration of the cluster and the deformed configuration of the first volumetric model.

The strain error may in particular be written as $\varepsilon_i^M - \varepsilon_i^T$ where $\varepsilon_i^M$ is a strain of an elementary volumetric element i of the cluster between an initial configuration of the second volumetric model without the set of predefined loads and constraints and a deformed configuration of the cluster under the set of predefined loads and constraints and $\varepsilon_i^T$ is a displacement of an elementary volumetric element i of the first volumetric model between the initial configuration of the first volumetric model and the deformed configuration of the first volumetric model.

Alternatively, the cost functions may be function of strain, stress, reaction force and the like . . . .

Several cost functions may be used depending on the progress of the method and/or the size of the cluster.

A first example of a suitable cost function Jg can be written as:

$$Jg = \sqrt{\frac{1}{n}\sum_{i=1}^{n}(\varepsilon_i^M - \varepsilon_i^T)^2} \quad (1)$$

where n is the number of elementary volumetric elements in the cluster and $\varepsilon_i^M - \varepsilon_i^T$ is the strain error between the deformed configuration of the cluster and the deformed configuration of the first volumetric model. This cost function (1) is always positive.

Another example of cost function $J_{Cl}$ is:

$$J_{Cl} = \frac{1}{n}\sum_{i=1}^{n}(\varepsilon_i^M - \varepsilon_i^T) \quad (2)$$

where n is the number of elementary volumetric elements in the cluster and $\varepsilon_i^M - \varepsilon_i^T$ is the strain error between the deformed configuration of the cluster and the deformed configuration of the first volumetric model. This cost function (2) can be positive or negative.

Yet another example of a suitable cost function $J_i$, specifically adapted for a cluster containing only a single elementary volumetric element is:

$$J_i = \frac{\varepsilon_i^M - \varepsilon_i^T}{\varepsilon_i^T} \quad (3)$$

where $\varepsilon_i^M - \varepsilon_i^T$ is the strain error between the deformed configuration of the cluster and the deformed configuration of the first volumetric model. This cost function (3) can be positive or negative.

A selected cost function (1)-(3) is computed during an operation b1) which is illustrated in greater detail on FIG. 2 and comprises a first sub-operation of b1-1) assigning to each elementary volumetric element of said cluster identical intrinsic material properties associated to a selected material.

The object material may be then selected in a predefined subset of M materials of the database of object materials.

Method for defining said subset of M materials and for selecting the object material in said subset of M materials are detailed further below.

Then, during a sub-operation b1-2) a deformed configuration VM2-CD of the second volumetric model under the set of predefined loads and constraints is determined as illustrated on FIG. 4A.

The deformed configuration of the second volumetric model may be determined by performing a finite element simulation of the deformation of the second volumetric model under the set of predefined loads and constraints.

Once the deformed configuration of the second volumetric model has been determined, the cost function of the cluster associated to said material can be computed b1-3). The cost function is for instance computed from the selected equation (1)-(3) detailed above.

In a first embodiment of the invention, operation b1) is performed for each material of a subset of M materials of the database of object materials.

Each material of the subset of M materials of the database of object materials is thus successively selected, assigned to every elementary volume element of the cluster, the deformed configuration of the second volumetric model is determined and the associated cost function is computed.

Once a cost function has been associated to each material of the subset of M materials, a cluster object material can be selected (operation b2) in the database of object materials by comparing the cost functions and selecting the object material associated to the lowest cost function for instance.

In another embodiment of the invention, the subset of M materials of the database of object materials can be ordered according to a physical property of said materials.

The physical property may for instance be selected among the intrinsic material properties, for instance a density of a material, Young Modulus, Poisson ratio, thermal conductivity, electric conductivity.

For instance, the materials in the subset can be ordered based on their stiffness, from the softest to the hardest, for instance according to a multi-axial tensile modulus.

In this embodiment, step b) may be performed as follows:

A first material may be pre-selected in the ordered subset of M materials of the database of object materials, for instance a material associated to a median or mean physical property of the materials of the ordered subset.

Then, a first deformed configuration cost function may be computed b1) for said pre-selected material.

Then, a function of the computed cost function, for instance an absolute difference between the computed cost function and a previously computed cost function, is compared to a termination criterion in an operation b2). The termination criterion is for instance a maximal difference threshold.

If said function of the computed cost function satisfies the termination criterion the pre-selected material can be selected as the cluster object material in an operation b3-1).

The function of the computed cost function satisfies the termination criterion, another material is pre-selected in the subset of M materials.

To this aim, the cost function is compared to a direction criterion, for instance a direction threshold and another material of the ordered subset is selected on the basis of the result of said comparison.

An example is illustrated on FIGS. 4B and 4C.

In this example the cost function is computed according to equation (2) which can get positive and negative values. The direction criterion is a comparison with the threshold value 0.

If the cost function is negative, the deformation of the cluster was too small with regard to the target deformation, the material is thus updated to the next softer material of the subset of M materials.

If the cost function is positive, the deformation of the cluster was too high with regard to the target deformation, the material is thus updated to the next stiffer material of the subset of M materials.

Operations b1) through b3) can then be reiterated until the termination criterion is met.

The terminal criterion is important to ensure that the algorithm can terminate and don't stay locked oscillating between two materials.

Indeed, since the materials shows a discrete range of physical properties, the difference between the deformed configuration of the second volumetric model and the deformed configuration can usually not be reduced to zero.

A remaining error thus has to be accepted and is encoded in the termination criterion.

The termination criterion may also take into account cases when an extremity of the range of physical property of the subset of material is reached.

When the cluster object material has been selected, the method can move on to step c).

During step c), the elementary volumetric elements of the cluster are partitioned in at least two sub-clusters based on the deformed configuration of the cluster.

To this aim a location of each elementary volumetric element in the deformed configuration of the cluster may be compared with a location of the associated elementary volumetric element in the deformed configuration of the first volumetric model (operation c1).

A number of sub-clusters can be defined to classify the results of these comparisons as illustrated on FIGS. 4B and 4C.

As a matter of non-limitative example, three sub-clusters CL1, CL2, CL3 are defined in the example of FIG. 4B as follows:

sub-cluster CL3 comprises the elementary volumetric elements which are displaced too much in the deformed configuration of the second volumetric model with regard to the deformed configuration, sub-cluster CL1 comprises the elementary volumetric elements which are not displaced enough in the deformed configuration of the second volumetric model with regard to the deformed configuration, and sub-cluster CL2 comprises the elementary volumetric elements which can be considered as being within an acceptable distance of the deformed configuration.

Of course, more or less sub-clusters may be defined in order to partition more finely or more roughly the cluster.

In addition, or in variant, the partitioning operation may take into account other properties relating to the deformed configuration of the cluster.

An example of higher order property is for instance the normal direction of each elementary volume element with regard to the normal direction of the associated element in the deformed configuration.

During this step, a subset of materials of the database of object materials may be associated (operation c2) to each sub-cluster on the basis of the deformed configuration of the cluster.

As a matter of example, let's define the database of materials as containing m materials referenced as Mat_1, . . . , Mat_m and ordered according to a measure of the stiffness of said materials as detailed above.

In this example, we assume that material Mat_k with $1 \leq k \leq m$ was selected during step b). Sub-cluster A, which comprises the elementary volumetric elements that are displaced too much in the deformed configuration of the second volumetric model, can then be associated with a subset of harder materials of the material database, for instance the subset Mat_k, . . . , Mat_m. Sub-cluster B, which comprises the elementary volumetric elements that are not displaced enough in the deformed configuration of the second volumetric model, can be associated with a subset of softer materials of the material database, for instance the subset Mat_1, . . . , Mat_k. Sub-cluster C comprises the elementary volumetric elements that are considered to have an acceptable behavior and whose selected material can thus stay identical. The subset associated to sub-cluster C can thus be restricted to Mat_k.

Other ways to associate a subset of material to a given sub-cluster can be defined, for instance by selecting overlapping ranges of materials.

It is understood that, during the first occurrence of step b) in the method, the cluster may comprise the entire second volumetric model. The subset of materials associated to this cluster may then comprise the whole range of material of the database.

Once the elementary volumetric elements of the cluster have been partitioned, steps b) and c) of the method can be repeated for each sub-cluster of the partition.

The method can then involve a recursive computation on smaller and smaller cluster until each sub-clusters comprise a single elementary volumetric element.

On example is illustrated on FIG. 4C on which sub-cluster CL1 is again divided in three sub-clusters CL1-1, CL1-2, CL1-3.

Alternatively or in addition, steps b) and c) of the method can be repeated until a difference between the deformed configuration of the second volumetric model and the deformed configuration of the first volumetric model of the object satisfy a convergence criterion.

For instance, a general cost function of the deformed configuration of the entire second volumetric model (for example based on equation 1) may be computed and compared to a convergence criterion, for instance a threshold on the maximum error over the whole second volumetric model.

If the convergence criterion is met, the reiteration of steps b) and c) can be stopped.

Then, a 3D surface model for fabricating the object may be generated from the second volumetric model and the materials assigned to each elementary volumetric element of the second volumetric model.

The 3D model may for example comprise a plurality of 3D files such as STL files (file format native to the stereolithography CAD software created by 3D Systems, Rock Hill, S.C.). Each file may be associated to a single material of the plurality of material printable by a 3D printer. More precisely, each file may correspond to a surface mesh delimiting all the elementary volumetric elements which are associated with the same material of the plurality of material printable by a 3D printer.

The 3D surface model may be used for manufacturing the object.

The method according to the invention may include the final step of fabricating the object.

The fabrication of the object may be performed at least in part by additive manufacturing in particular by 3D printing.

It is understood by those of ordinary skill in the art that the final object can be manufactured using both traditional and state-of-the-art methods including, but not limited to, casting, 3D printing, mechanical linkages of disparate materials and material deposition manufacturing.

Additional non-polymerizable materials such as water, gels, metals, ions, ceramics, bio-molecules and the like may be used and may be deposited using various techniques encompassing casting, 3D printing, mechanical linkages of desperate materials and shape deposition manufacturing.

In some embodiments, the elementary volumetric elements may be replicated with a plurality of printed layers, e.g. 5-20 printing layers.

According to some embodiment of the present invention, a multi-material additive manufacturing device able to fabricate the object may be equipped with several building materials, in particular at least two building materials, each having different mechanical properties as detailed above.

Optionally, the multi-material additive manufacturing device may be equipped to dispense the additional material, e.g. non-printable materials such as water, gels, metals, ions, ceramics, bio-molecules and the like.

In one embodiment of the present invention, advanced 3D printing technology may be used that enable seamless integration of various materials in the object. For instance, Stratasys, Ltd. (North America, 7665 Commerce Way Eden Prairie, Minn. 55344. Phone: +1 952-937-3000 Fax: +1 952-937-0070) produces advanced 3D printers using PolyJet Matrix™ Technology that enables a plurality of material durometers to be simultaneously jetted in the production of the same mechanical device, allowing for spatially varying viscoelastic properties within the simulation device.

With a 16-micron, high-resolution print layer, high dots-per-inch in both X and Y resolution, and an easy-to-remove support material property, this technology allows to develop simulation device with mechanical properties that are adjusted at the scale of the living tissues.

The multi-material object fabricated by implementing the method of the invention may be a physical simulation device. A physical simulation device is able to simulate the mechanical behavior of a complex object such as an heterogeneous object or an homogeneous object with complex mechanical behavior that are difficult to reproduce in a manufactured object without relying on a combination of several materials.

Among other fields, the physical simulation can find applications in surgical training and medical device development and testing.

As non-limited and non-exhaustive examples, a physical simulation device can be an aid for planning surgery, in particular to train surgeons to perform operations using physical simulation devices of living tissues.

Eventually, another object of the invention is an apparatus 500 for generating a 3D model for fabricating a multi-material object according to a method as detail above.

Figure 6:
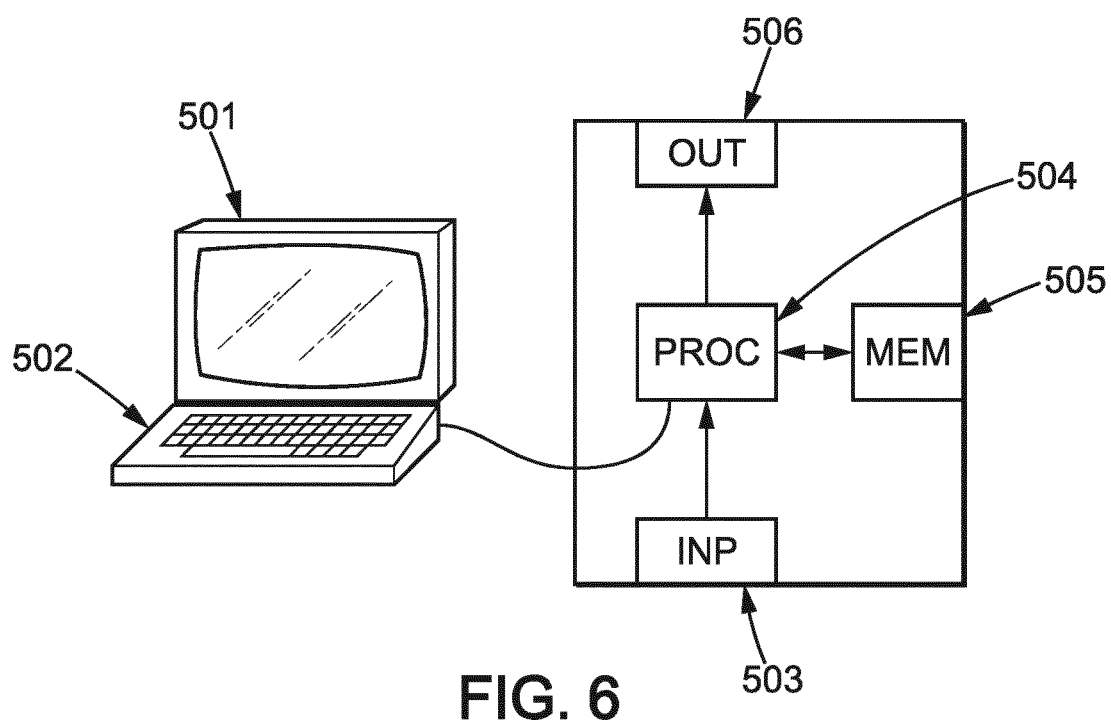
FIG. 6 illustrates an embodiment of an apparatus for generating a 3D model for fabricating a multi-material object according to the invention.

Such an apparatus is illustrated on FIG. 6 and comprises:
an input unit 503 operative to receive at least a first volumetric model of an object, a set of predefined loads and constraints to be applied on the second volumetric model of the object and a deformed configurations of the first volumetric model of the object
a memory unit 505 operative to store said first volumetric model of an object, predefined load to be applied on the second volumetric model of the object and deformed configurations of the first volumetric model of the object,
a processing unit 504 operative to
generate a second volumetric model from said first volumetric model, said second volumetric model being divided in a plurality of elementary volumetric elements,
assign to each elementary volumetric element of the second volumetric model a material selected in a database of M object materials by:
a) defining a cluster of elementary volumetric elements of the second volumetric model,
b) selecting a cluster object material in the database of object materials by minimizing a cost function of said cluster determined by computing at least one deformed configuration of the second volumetric model under the set of predefined loads and constraints wherein at least one elementary volumetric element of said cluster has been assigned intrinsic material properties associated to a material of the database of object materials,
c) partitioning the elementary volumetric elements of said cluster in at least two sub-clusters based on the deformed configuration of said cluster, d) repeating at least once step b) for each of said at least two sub-clusters, and generate a 3D model for fabricating an object from the second volumetric model and the materials assigned to each elementary volumetric element of the second volumetric model, and an output unit 506 able to output said generated 3D model.

To ease the interaction with the computer, a screen 501 and a keyboard 502 may be provided and connected to the processing unit 504.

Although many embodiments have been described in reference to generating a 3D model for fabricating a multi-material object using additive manufacturing, the embodiments of the present invention are not limited in that respect and that the same system and methods can be used for fabricating simulating devices of other internal elements.

The terms "comprises", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for generating a three-dimensional model for fabricating a multi-material anatomical model using additive manufacturing, the method comprising:

providing a first volumetric model of an anatomic object in at least a deformed configuration, said first volumetric model including a plurality of three-dimensional first nodes which define a plurality of first elementary volumetric elements partitioning a first space region modeled by the first volumetric model;

generating a second volumetric model from said first volumetric model, said second volumetric model including a plurality of three-dimensional second nodes which define a plurality of second elementary volumetric elements;

assigning to each second elementary volumetric element of the second volumetric model a material selected in a database of M object materials by performing at least the following steps:

a) defining a cluster of second elementary volumetric elements of the second volumetric model, b) selecting a cluster object material in the database of object materials by minimizing a cost function of said cluster, step b) comprising an operation b1) of computing a cost function associated to at least one material of the database of object materials, said operation b1) comprising:

b1-1) assigning to each second elementary volumetric element of said cluster identical intrinsic material properties associated to said material, b1-2) determining a deformed configuration of the second volumetric model under a set of predefined loads and constraints, b1-3) computing a cost function of said cluster associated to said material, said cost function being a function of the deformed configuration of said cluster and the deformed configuration of the first volumetric model, c) partitioning the second elementary volumetric elements of said cluster in at least two sub-clusters based on the deformed configuration of said cluster, d) repeating at least once step b) for each of said at least two sub-clusters, and e) generating a three-dimensional model for fabricating the anatomic object from the second volumetric model and the materials assigned to each elementary volumetric element of the second volumetric model;

wherein the cost function in step b1-3) is a function of at least one of stress and strain error between the deformed configuration of said cluster and the deformed configuration of the first volumetric model.

2. The method according to claim 1, wherein said operation b1) of computing a deformed configuration cost function of the second volumetric model is performed for each element of a subset of M materials of the database of object materials, and wherein step b) further comprises an operation b2) of selecting a cluster object material in the database of object materials by comparing the cost functions computed for each element in said subset of M materials of the database of object materials.

3. The method according to claim 1, wherein an ordered subset of M materials of the database of object materials is associated to a cluster of the second volumetric model, and wherein the materials of said ordered subset are ordered according to a physical property of said materials, in particular according to a stiffness and an elasticity of said materials.

4. The method according to claim 3, said operation b1) of computing a deformed configuration cost function of the second volumetric model is performed for a pre-selected material in the ordered subset of M materials of the database of object materials, and wherein step b) further comprises the operations of:

b2) comparing a function of said cost function to a termination criterion to determine whether said pre-selected material can be selected as the cluster object material, b3-1) if said pre-selected material can be selected as the cluster object material perform step c), b3-2) if said pre-selected material cannot be selected as the cluster object material, pre-selecting another material in said subset of M materials of the database of object materials by comparing said cost function to a direction criterion and reiterate at least once operations b1) through b3-1), b3-2).

5. The method according to claim 1, wherein each elementary volumetric element of the cluster of the second volumetric model is respectively associated with at least one first elementary volumetric element of the first volumetric model.

6. The method according to claim 1, wherein step c) comprises an operation c1) of comparing a location of at least one elementary volumetric element in the deformed configuration of the cluster with a location of at least one elementary volumetric element in the deformed configuration of the first volumetric model.

7. The method according to claim 1, wherein the step of partitioning the elementary volumetric elements of the cluster in at least two sub-clusters comprises an operation c2) of determining, for each sub-cluster of said at least two sub-clusters, a subset of materials of the database of object materials associated to said sub-cluster on the basis of the deformed configuration of the cluster.

8. The method according to claim 1, wherein steps b) and c) are repeated until each sub-cluster comprises a single elementary volumetric element.

9. The method according to anyone of claim 1, wherein steps b) and c) are repeated until a difference between the deformed configuration of the second volumetric model and the deformed configuration of the first volumetric model of the object satisfy a convergence criterion, where the second volumetric model assigns materials to each second elementary volumetric element corresponding to an optimized material distribution of the materials available in the database such that a deformed configuration of the second volumetric model approximates a deformed configuration of the first volumetric model.

10. A method for generating a three-dimensional model for fabricating a multi-material anatomic object using additive manufacturing, the method comprising:
providing a first volumetric model of an anatomic object in at least a deformed configuration, said first volumetric model including a plurality of three-dimensional first nodes which define a plurality of first elementary volumetric elements partitioning a first space region modeled by the first volumetric model;
generating a second volumetric model from said first volumetric model, said second volumetric model including a plurality of three-dimensional second nodes which define a plurality of second elementary volumetric elements;
assigning to each second elementary volumetric element of the second volumetric model a material selected in a database of M object materials by performing at least the following steps:
a) defining a cluster of second elementary volumetric elements of the second volumetric model,
b) selecting a cluster object material in the database of object materials by minimizing a cost function of said cluster, step b) comprising an operation b1) of computing a cost function associated to at least one material of the database of object materials, said operation b1) comprising:
b1-1) assigning to each second elementary volumetric element of said cluster identical intrinsic material properties associated to said material,
b1-2) determining a deformed configuration of the second volumetric model under a set of predefined loads and constraints,
b1-3) computing a cost function of said cluster associated to said material, said cost function being a function of the deformed configuration of said cluster and the deformed configuration of the first volumetric model,
c) partitioning the second elementary volumetric elements of said cluster in at least two sub-clusters based on the deformed configuration of said cluster,
d) repeating at least once step b) for each of said at least two sub-clusters,
partitioning a surface of the first volumetric element into segments, and for each segment assigning intrinsic mechanical properties and predefined loads and constraints which compensate for mechanical interactions with a surrounding environment;
generating a three-dimensional model for fabricating the anatomic object from the second volumetric model and the materials assigned to each elementary volumetric element of the second volumetric model;
receiving a three-dimensional model of the anatomic object comprising at least one surface mesh representative of an interface of the anatomic object, in particular an interface of the anatomic object associated to a discontinuity in the physical properties of the anatomic object,
generating the first volumetric model from said three-dimensional surface mesh by performing a finite-element volumetric model generation.

11. The method according to claim 10, wherein the set of predefined loads and constraints comprise a load on said interface of the anatomic object.

12. The method according to claim 1, wherein the database of object materials comprises a plurality of three-dimensional printed materials and, optionally, additional metamaterials and non-printable materials such as water, gels, metals, ions, ceramics, bio-molecules and the like.

13. A system for generating a three-dimensional model for fabricating a multi-material anatomic object using additive manufacturing, the system comprising:
a memory unit operative to store at least a first volumetric model of an anatomic object, a set of predefined loads and constraints to be applied on the first volumetric model of the anatomic object and a deformed configuration of the first volumetric model of the anatomic object under the set of predefined loads and constraints,
a processing unit operative to generate a second volumetric model from said first volumetric model, said second volumetric model being divided in a plurality of elementary volumetric elements,
assign to each elementary volumetric element of the second volumetric model a material selected in a database of M object materials by:
a) defining a cluster of elementary volumetric elements of the second volumetric model,
b) selecting a cluster object material in the database of object materials by minimizing a cost function of said cluster, step b) comprising an operation b1) of computing a cost function associated to at least one material of the database of object materials, said operation b1) comprising:
b1-1) assigning to each elementary volumetric element of said cluster
identical intrinsic material properties associated to said material,
b1-2) determining a deformed configuration of the second volumetric model under a set of predefined loads and constraints,
b1-3) computing a cost function of said cluster associated to said material, said cost function being a function of the deformed configuration of said cluster and the deformed configuration of the first volumetric model,
c) partitioning the elementary volumetric elements of said cluster in at least two sub-clusters based on the deformed configuration of said cluster,
d) repeating at least once step b) for each of said at least two sub-clusters, and
generating a three-dimensional model for fabricating a multi-material anatomic object from the second volumetric model and the materials assigned to each elementary volumetric element of the second volumetric model; and fabricating a multi-material three-dimensional anatomic object having the deformed configuration of the first volumetric model from the second volumetric model and the materials assigned to each elementary volumetric element of the second volumetric model;

wherein the cost function in step b1-3) is a function of at least one of a stress and a strain error between the deformed configuration of said cluster and the deformed configuration of the first volumetric model.

\* \* \* \* \*